(12) United States Patent
Oinuma et al.

(10) Patent No.: US 10,415,123 B2
(45) Date of Patent: Sep. 17, 2019

(54) AUSTENITIC HEAT RESISTANT STEEL AND TURBINE COMPONENT

(71) Applicant: KABUSHIKI KAISHA TOSHIBA, Minato-ku (JP)

(72) Inventors: Shun Oinuma, Yokohama (JP); Kiyoshi Imai, Taito (JP); Shigekazu Miyashita, Yokohama (JP); Kuniyoshi Nemoto, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 287 days.

(21) Appl. No.: 15/643,876

(22) Filed: Jul. 7, 2017

(65) Prior Publication Data

US 2017/0314106 A1    Nov. 2, 2017

Related U.S. Application Data

(63) Continuation of application No. PCT/JP2016/000048, filed on Jan. 7, 2016.

(30) Foreign Application Priority Data

Jan. 7, 2015 (JP) .................................. 2015-001910

(51) Int. Cl.
*C22C 38/32* (2006.01)
*C22C 38/00* (2006.01)
(Continued)

(52) U.S. Cl.
CPC ............ *C22C 38/32* (2013.01); *C22C 19/058* (2013.01); *C22C 38/00* (2013.01); *C22C 38/004* (2013.01); *C22C 38/06* (2013.01); *C22C 38/105* (2013.01); *C22C 38/24* (2013.01); *C22C 38/26* (2013.01); *C22C 38/28* (2013.01); *C22C 38/30* (2013.01); *C22C 38/40* (2013.01); *C22C 38/46* (2013.01); *C22C 38/48* (2013.01); *C22C 38/50* (2013.01); *C22C 38/52* (2013.01); *C22C 38/54* (2013.01); *F01D 5/28* (2013.01); *F01D 9/02* (2013.01); *F01D 9/041* (2013.01); *F01D 25/00* (2013.01);
(Continued)

(58) Field of Classification Search
CPC .............................. C22C 38/32; C22C 38/00
USPC ........................................................ 420/64
See application file for complete search history.

(56) References Cited

U.S. PATENT DOCUMENTS

2010/0136361 A1    6/2010    Osuki et al.
2011/0200843 A1    8/2011    Osuki et al.

FOREIGN PATENT DOCUMENTS

CA         2 711 748          7/2009
CN       101925436 A         12/2010
(Continued)

OTHER PUBLICATIONS

Peckner D. et al., "Handbook of Stainless Steels, Passage", Handbook of Stainless Steels, Jan. 1, 1977, p. 14.02, XP002053955.
(Continued)

*Primary Examiner* — Weiping Zhu
(74) *Attorney, Agent, or Firm* — Oblon, McClelland, Maier & Neustadt, L.L.P.

(57) ABSTRACT

The austenitic heat resistant steel of the embodiment contains: 24 to 50% by mass of Ni, 5 to 13% by mass of Cr, 0.1 to 12% by mass of Co, 0.1 to 5% by mass of Nb, 0.1 to 0.5% by mass of V, 1.90 to 2.35% by mass of Ti, 0.01 to 0.30% by mass of Al, 0.001 to 0.01% by mass of B, 0.001 to 0.1% by mass of C, and the balance being Fe and inevitable impurities.

8 Claims, 1 Drawing Sheet

(51) Int. Cl.
| | |
|---|---|
| C22C 38/54 | (2006.01) |
| F01D 5/28 | (2006.01) |
| F01D 9/02 | (2006.01) |
| F01D 25/00 | (2006.01) |
| F02C 7/00 | (2006.01) |
| C22C 38/06 | (2006.01) |
| C22C 38/24 | (2006.01) |
| C22C 38/26 | (2006.01) |
| C22C 38/28 | (2006.01) |
| C22C 38/30 | (2006.01) |
| F01D 9/04 | (2006.01) |
| C22C 19/05 | (2006.01) |
| C22C 38/10 | (2006.01) |
| C22C 38/40 | (2006.01) |
| C22C 38/46 | (2006.01) |
| C22C 38/48 | (2006.01) |
| C22C 38/50 | (2006.01) |
| C22C 38/52 | (2006.01) |
| C22C 30/00 | (2006.01) |

(52) U.S. Cl.
CPC .............. *F01D 25/005* (2013.01); *F02C 7/00* (2013.01); *C21D 2211/001* (2013.01); *C22C 30/00* (2013.01); *F05D 2220/30* (2013.01); *F05D 2300/171* (2013.01)

(56) References Cited

FOREIGN PATENT DOCUMENTS

| | | |
|---|---|---|
| CN | 102086496 A | 6/2011 |
| CN | 102744530 A | 10/2012 |
| EP | 2 243 591 A1 | 10/2010 |
| JP | 55-100948 | 8/1980 |
| JP | 2009-195980 | 9/2009 |
| JP | 2011-195880 | 10/2011 |
| JP | 2014-109053 | 6/2014 |
| JP | 2015-86432 | 5/2015 |
| JP | 2015-183256 | 10/2015 |
| KR | 10-2010-0113106 | 10/2010 |
| WO | WO 2009/093676 A1 | 7/2009 |

OTHER PUBLICATIONS

International Search Report dated Apr. 5, 2016 in PCT/JP2016/000048 filed Jan. 7, 2016 (with English translation).
Written Opinion dated Apr. 5, 2016 in PCT/JP2016/000048 filed Jan. 7, 2016.

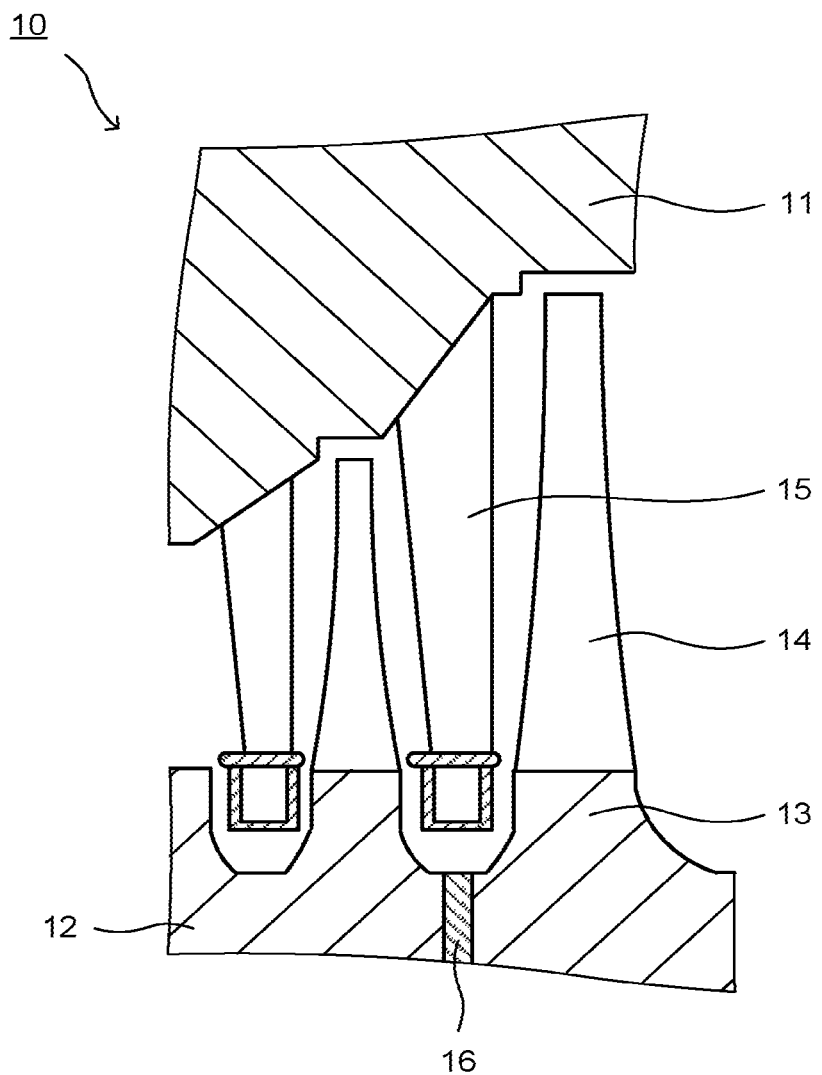

AUSTENITIC HEAT RESISTANT STEEL AND TURBINE COMPONENT

CROSS-REFERENCE TO RELATED APPLICATIONS

This application is a continuation of prior International Application No. PCT/JP2016/000048, filed on Jan. 7, 2016 which is based upon and claims the benefit of priority from Japanese Patent Application No. 2015-001910 filed on Jan. 7, 2015; the entire contents of all of which are incorporated herein by reference.

TECHNICAL FIELD

Embodiments described herein generally relate to austenitic heat resistant steel and a turbine component.

BACKGROUND

In recent years, increasing efficiency of power generation plants is in progress from a viewpoint of reducing emission of carbon dioxide into the air. Accordingly, increasing efficiency of a steam turbine and a gas turbine included in a thermal power generation plant is demanded. Besides, increasing efficiency of a $CO_2$ turbine capable of being installed in the thermal power generation plant is also demanded.

It is effective to increase an inlet temperature of working fluid introduced to a turbine to increase the efficiency in the above-described each turbine. For example, in the steam turbine, an operation under a condition where a temperature of steam being the working fluid is 650° C. or more, further approximately 700° C. is expected in the future. There is a tendency that the inlet temperature of the introduced working fluid increases also in the gas turbine and the $CO_2$ turbine.

Conventionally, ferritic heat resistant steel or the like has been used for turbine components exposed to the temperature at approximately 600° C. However, there is a problem in heat resistance to constitute the turbine components exposed to the high-temperature working fluid as stated above with the ferritic heat resistant steel. Accordingly, the turbine components exposed to the high-temperature working fluid are constituted by austenitic heat resistant steel, an Ni-based alloy, a Co-based alloy, and so on. Among them, a service temperature of the austenitic heat resistant steel is higher than the ferritic heat resistant steel for approximately 50° C., and a material cost of the austenitic heat resistant steel is approximately one-third of the Ni-based alloy. Accordingly, it is possible to suppress a manufacturing cost and to enable high efficiency by using the austenitic heat resistant steel.

There has been a lot of development regarding the austenitic heat resistant steel mainly focusing on improvement in high-temperature strength. However, the austenitic heat resistant steel has a characteristic where a linear expansion coefficient is high, and there is a problem that repeated thermal stress due to start/stop operation is excessively generated when the austenitic heat resistant steel is considered to be applied to a valve and an inner casing of a steam turbine. Besides, it is known that crack sensitivity of the austenitic heat resistant steel at a welding time is high, and manufacturing defects are easy to occur when the valve and the inner casing are manufactured by welding. In publicly known austenitic heat resistant steel such as Alloy286, improvement in high-temperature creep strength is attempted by using an intermetallic compound as a precipitation strengthening phase. However, there is not proposed heat resistant steel securing excellent weldability while having a low linear expansion coefficient.

Thermal expansion characteristics and weldability of a material are important factors in designing a high-temperature structural material. However, in conventional austenitic heat resistant steel, it was difficult to secure excellent weldability while having a low linear expansion coefficient.

BRIEF DESCRIPTION OF THE DRAWINGS

FIG. 1 is a sectional view illustrating an example of a turbine where austenitic heat resistant steel of the embodiment is applied.

DETAILED DESCRIPTION

Hereinafter, an embodiment of the present invention is described.

Austenitic heat resistant steel according to the embodiment contains: in mass, Ni: 24 to 50%, Cr: 5 to 13%, Co: 0.1 to 12%, Nb: 0.1 to 5%, V: 0.1 to 0.5%, Ti: 1.90 to 2.35%, Al: 0.01 to 0.30%, B: 0.001 to 0.01%, C: 0.001 to 0.1%, with the balance being Fe and inevitable impurities.

According to the embodiment of the present invention, it is possible to obtain the austenitic heat resistant steel and the turbine component capable of securing the excellent weldability while having the low linear expansion coefficient.

The present inventors found that it is possible to obtain a material with a low linear expansion coefficient and sufficient weldability by adding Ni and reducing an Al amount to a minimum in conventional austenitic heat resistant steel.

The conventional austenitic heat resistant steel is strengthened by precipitating a γ' phase to a base material by adding Al. However, it is known that the precipitation of the γ' phase may simultaneously cause intercrystalline cracks due to acceleration of a strength difference between a grain inside and a grain boundary when molten metal of welding, casting, and the like is solidified. Therefore, the present inventors found that it is possible to suppress the precipitation of the γ' phase and to suppress the crack sensitivity by reducing Al being a main constituent element of the γ' phase to the minimum to suppress the occurrence of the cracks. Further, the present inventors found that the linear expansion coefficient is reduced by adding Ni, and it is possible to simultaneously suppress lowering of strength resulting from the reduction in Al by enabling solid-solution strengthening.

Hereinafter, an embodiment is concretely described. Note that in the following description, a sign "%" representing a composition component means mass % unless otherwise specified.

The austenitic heat resistant steel according to the embodiment contains: in mass, Ni: 24 to 50%, Cr: 5 to 13%, Co: 0.1 to 12%, Nb: 0.1 to 5%, V: 0.1 to 0.5%, Ti: 1.90 to 2.35%, Al: 0.01 to 0.30%, B: 0.001 to 0.01%, C: 0.001 to 0.1%, with the balance being Fe and inevitable impurities.

Here, as the inevitable impurities in the austenitic heat resistant steel of the embodiment, there can be cited, for example, N, Si, Mn, P, S, and so on.

Besides, it is preferable that an average linear expansion coefficient of the austenitic heat resistant steel of the embodiment in temperatures from a room temperature to 700° C. is $18 \times 10^{-6}$/K or less. Here, the average linear expansion coefficient can be found by the following expression (1) by using a length ($L_0$) at a room temperature ($T_0$) and a length (L) at a predetermined temperature (T) in the same test piece.

$$\text{Average linear expansion coefficient} = (L-L_0)/(T-T_0)/L_0 \quad \text{expression (1)}$$

The above-stated average linear expansion coefficient at the temperature from the room temperature to 700° C. is found by the expression (1) by using the length ($L_0$) at the room temperature ($T_0$) and the length (L) at the temperature (T=700° C.).

Here, when the austenitic heat resistant steel with high linear expansion coefficient is used in, for example, a power generation plant, a lifetime and performance of the power generation plant may be interfered. Specifically, for example, when the austenitic heat resistant steel as stated above is used for a turbine component, thermal fatigue excessively occurs due to expansion at a startup time and shrinkage at a stop time of the power generation plant, and there is a possibility that the turbine component is damaged in early stage. Therefore, it is preferable to set the average linear expansion coefficient of the austenitic heat resistant steel at the temperature from the room temperature to 700° C. to $18 \times 10^{-6}$/K or less so as to avoid the above-stated problem.

Here, a reason why a regulated temperature of each of the average linear expansion coefficient and a creep rupture elongation is set to 700° C. is because a temperature zone where the austenitic heat resistant steel of the embodiment is used is approximately 700° C. at the maximum.

Besides, the austenitic heat resistant steel of the embodiment is desired not to have defects such as cracks at the welding time. It is proper to manufacture a welded joint using the austenitic heat resistant steel of the embodiment as a welded metal and to check presence/absence of crack occurrences by a side bend test so as to evaluate the defects at the welding time.

The austenitic heat resistant steel of the embodiment is suitable as a material constituting the turbine component whose temperature at an operation time becomes 650° C. or more, further approximately 700° C. There can be cited, for example, a turbine casing, a rotor blade, a stator blade, a turbine rotor, a screwing member, a pipe, a valve, and so on, as the turbine components. Here, there can be exemplified, for example, bolts, nuts, and so on to fix various kinds of components in the turbine casing and the turbine, as the screwing member. There can be exemplified, for example, a pipe which is provided at a power generation turbine plant or the like, and through which high-temperature and high-pressure working fluid passes, and the like, as the pipe.

Every portion of the above-stated turbine components may be constituted by the austenitic heat resistant steel of the embodiment. Besides, a part of the portion of the turbine components whose temperature becomes 650° C. or more may be constituted by the austenitic heat resistant steel of the embodiment.

The austenitic heat resistant steel of the embodiment has high-temperature strength equivalent to the conventional austenitic heat resistant steel, the low linear expansion coefficient and excellent weldability compared to the conventional austenitic heat resistant steel. Accordingly, the turbine components manufactured by using the austenitic heat resistant steel of the embodiment also have similar characteristics as the austenitic heat resistant steel of the embodiment, and have high reliability.

The above-stated austenitic heat resistant steel and turbine components of the embodiment can be applied to power generation turbines such as, for example, a steam turbine, a gas turbine, and a $CO_2$ turbine.

FIG. 1 illustrates an example of a turbine.

A turbine 10 includes, for example, a casing 11, a turbine rotor 12, a turbine disk 13, a rotor blade 14, and a stator blade 15. The turbine rotor 12 is provided inside the casing 11 so as to penetrate the casing 11. The turbine rotor 12 and the turbine disk 13 are welded to be bonded by a welded part 16. Note that the turbine 10 may be one which does not have one of the turbine rotor 12 or the turbine disk 13, or one in which a plurality of turbine rotors 12 and turbine disks 13 are combined. A plurality of rotor blades 14 are implanted at a periphery of each turbine rotor 12 and turbine disk 13. Besides, the stator blade 15 is disposed in front of the rotor blade 14. The stator blade 15 is supported by the casing 11. One turbine stage is formed by the rotor blade 14 and the stator blade 15.

Next, limitation reasons of each composition component range in the austenitic heat resistant steel of the embodiment are described.

(1) Ni (Nickel)

Ni is solid-solved in an Fe parent phase, and brings about solid-solution strengthening of the parent phase and lowering of the linear expansion coefficient. These effects are exerted when an Ni content is 24% or more. Besides, when the Ni content is 50% or less, increasing in a manufacturing cost and lowering of processability are suppressed. Accordingly, the Ni content was set to 24 to 50%. The Ni content is more preferably 34 to 45%, further preferably 38 to 45%, and the most preferably 38 to 41%.

(2) Cr (Chromium)

Cr is solid-solved in the Fe parent phase, and brings about the solid-solution strengthening of the parent phase and the lowering of the linear expansion coefficient. Besides, Cr increases a solid-solution temperature of the γ' phase, and therefore, precipitation of the γ' phase is accelerated. These effects are exerted when a Cr content is 5% or more. Besides, when the Cr content is 13% or less, a stable austenite structure is obtained, and precipitation of a σ phase is suppressed. Accordingly, the Cr content was set to 5 to 13%. The Cr content is more preferably 6 to 10%, and further preferably 6 to 8%.

(3) Co (Cobalt)

Co is solid-solved in the Fe parent phase, and brings about the solid-solution strengthening of the parent phase and the lowering of the linear expansion coefficient. These effects are exerted when a Co content is 0.1% or more. Besides, when the Co content is 12% or less, increasing in the manufacturing cost and lowering of proof strength are suppressed. Accordingly, the Co content was set to 0.1 to 12%. The Co content is more preferably 0.1 to 6%, and further preferably 0.1 to 4%.

(4) Nb (Niobium)

Nb is solid-solved in the Fe parent phase, and brings about the solid-solution strengthening of the parent phase and the lowering of the linear expansion coefficient. Besides, Nb forms and stabilizes the γ' phase. These effects are exerted when an Nb content is 0.1% or more. Besides, when the Nb content is 5% or less, increasing in the manufacturing cost and precipitation of a δ ($Ni_3$(Nb, Ta)) phase (an intermetallic compound) are suppressed. Accordingly, the Nb content was set to 0.1 to 5%. The Nb content is more preferably 0.1 to 3%, and further preferably 0.1 to 2%.

(5) V (Vanadium)

V is solid-solved in the Fe parent phase, and brings about the lowering of the linear expansion coefficient. These effects are exerted when a V content is 0.1% or more. Besides, when the V content is 0.5% or less, the stable austenite structure can be obtained, and precipitation of the σ phase is suppressed. Accordingly, the V content was set to 0.1 to 0.5%. The V content is more preferably 0.1 to 0.4%, and further preferably 0.1 to 0.3%.

(6) Ti (Titanium)

Ti forms the γ' phase to increase strength. When a Ti content is 1.90% or more, acceleration of the precipitation of the γ' phase is enabled. Besides, when the Ti content is 2.35% or less, the stable austenite structure can be obtained, the increasing in the linear expansion coefficient is suppressed, and lowering of ductility caused by formation of carbide and nitride is suppressed. Accordingly, the Ti content was set to 1.90 to 2.35%.

(7) Al (Aluminum)

Al forms the γ' phase to increase the strength, but the γ' phase is excessively precipitated to lower the weldability resulting from the addition of Al. Accordingly, an Al content was set to 0.01 to 0.30%. The Al content is more preferably 0.01 to 0.20%, and further preferably 0.01 to 0.10%.

(8) B (Boron)

B is solid-solved in the Fe parent phase, and in particular, grain boundary segregation occurs to bring about grain boundary strengthening. Besides, there is an effect in B to suppress precipitation of an η phase when a lot of Ti is contained. These effects are exerted when a B content is 0.001% or more. Besides, when the B content is 0.01% or less, lowering of a melting point of the parent phase is suppressed, and lowering of hot workability is suppressed. Accordingly, the B content was set to 0.001 to 0.01%. The B content is more preferably 0.004 to 0.006%.

(9) C (Carbon)

C forms carbide with Cr or is solid-solved in the parent phase, and brings about the solid-solution strengthening of the parent phase. When a C content is less than 0.001%, the above-stated effect is not sufficiently exerted. On the other hand, when the C content exceeds 0.1%, the austenite structure becomes unstable, and the high-temperature strength is lowered because carbide is excessively coarsened. Accordingly, the C content was set to 0.001 to 0.1%. The C content is more preferably 0.01 to 0.08%, and further preferably 0.01 to 0.05%.

(10) N (Nitrogen), Si (Silicon), Mn (Manganese), P (Phosphor), and S (Sulfur)

N, Si, Mn, P and S are classified into inevitable impurities in the austenitic heat resistant steel of the embodiment. Remaining contents of these inevitable impurities are preferably approximated to "0" (zero) % as much as possible.

Next, manufacturing methods of the austenitic heat resistant steel of the embodiment and the turbine components manufactured by using the austenitic heat resistant steel are described.

The austenitic heat resistant steel of the embodiment is manufactured as, for example, described below. First, composition components composing the austenitic heat resistant steel are, for example, vacuum induction melted (VIM), then a molten metal is poured into a predetermined formwork to form an ingot. A solution heat treatment (solid-solution heat treatment) and an aging treatment are performed for the ingot to manufacture the austenitic heat resistant steel.

The turbine casing being the turbine component is manufactured as, for example, described below. First, the composition components composing the austenitic heat resistant steel are, for example, vacuum induction melted (VIM), then the molten metal is poured into a formwork to form into a shape of the turbine casing, and casting is performed in the air to manufacture a structure. The turbine casing is manufactured by performing the solution heat treatment and the aging treatment for the structure.

Note that the composition components composing the austenitic heat resistant steel may be, for example, electric furnace melted (EF) and argon-oxygen decarburized (AOD) to be the molten metal.

The rotor blade, the stator blade, the turbine rotor, the screwing member, the valve being the turbine components are manufactured as, for example, described below. First, the composition components composing the austenitic heat resistant steel of the embodiment are, for example, vacuum induction melted (VIM), electroslag remelted (ESR), poured into a predetermined pattern in a reduced pressure atmosphere to manufacture an ingot. The ingot is disposed in a pattern corresponding to each shape of the turbine component to perform forging process such as rolling. Subsequently, the rotor blade, the stator blade, the turbine rotor, and the screwing member are manufactured by performing the solution heat treatment, the aging treatment, and so on.

Note that the composition components composing the austenitic heat resistant steel may be, for example, vacuum induction melted (VIM), and vacuum arc remelted (VAR) to be the molten metal. Besides, the composition components composing the austenitic heat resistant steel may be, for example, vacuum induction melted (VIM), electroslag remelted (ESR), and vacuum arc remelted (VAR) to be the molten metal.

The pipe being the turbine component is manufactured as, for example, described below. First, the composition components composing the austenitic heat resistant steel is vacuum induction melted (VIM) to be the molten metal, or is electric furnace melted (EF) and argon-oxygen decarburized (AOD) to be the molten metal, and the molten metal is poured into a cylindrical pattern while it is rotated in high-speed. Subsequently, the molten metal is pressurized by using a centrifugal force of the rotation to manufacture a pipe-shaped structure (a centrifugal casting method). Then, the solution heat treatment and the aging treatment are performed for the structure to manufacture the pipe.

Note that the methods manufacturing the turbine components are not limited to the above-described methods.

Next, the solution heat treatment and the aging treatment are described.

The solution heat treatment is performed to remove working strain, regulate particle sizes, and enable a γ single phase. In the solution heat treatment, a treatment object member is retained at a temperature of 885 to 995° C. for a predetermined time, and thereafter, it is rapidly cooled to the room temperature. The above-stated effects are obtained at the temperature of 885° C. or more. Besides, excessive coarsening of crystal grains is suppressed at the temperature of 995° C. or less. The rapid cooling is performed by, for example, water cooling, forced air cooling, and so on.

The aging treatment is performed to precipitate the γ' phase in the crystal grains, and to supply the high-temperature strength. In the aging treatment, the treatment object member is retained at a temperature of 700 to 760° C. for a predetermined time, and thereafter, it is rapidly cooled to the room temperature. The γ' phase is sufficiently precipitated at the temperature of 700° C. or more. Besides, reduction in a precipitation density due to early coarsening of the γ' phase is suppressed at the temperature of 760° C. or less. The cooling is performed by, for example, natural cooling or the like in the air.

(Evaluation of Linear Expansion Coefficient, Creep Rupture Strength, and Creep Rupture Elongation)

Here, it is described that the linear expansion coefficient is reduced while keeping high-temperature creep strength of the conventional austenitic heat resistant steel, and sufficient ductility is obtained in the austenitic heat resistant steel of the embodiment.

Table 1 illustrates chemical compositions of a sample 1 to a sample 12 used for evaluation. Note that the sample 1 to the sample 9 are each the austenitic heat resistant steel in a chemical composition range of the embodiment, and the sample 10 to the sample 12 are each the austenitic heat resistant steel out of the chemical composition range of the embodiment, and are comparative examples.

TABLE 1

| | Chemical composition [mass %] | | | | | | | | |
|---|---|---|---|---|---|---|---|---|---|
| | Fe | Ni | Cr | Co | Nb | V | Ti | Al | B | C |
| Sample 1 | Balance | 24.6 | 9.5 | 4.8 | 2.85 | 0.12 | 2.00 | 0.015 | 0.004 | 0.001 |
| Sample 2 | Balance | 49.5 | 10.3 | 2.8 | 0.25 | 0.29 | 2.22 | 0.021 | 0.008 | 0.009 |
| Sample 3 | Balance | 25.8 | 11.9 | 3.4 | 2.01 | 0.46 | 2.33 | 0.011 | 0.006 | 0.005 |
| Sample 4 | Balance | 48.3 | 5.8 | 4.7 | 0.25 | 0.35 | 2.26 | 0.029 | 0.005 | 0.004 |
| Sample 5 | Balance | 40.1 | 6.1 | 0.2 | 1.22 | 0.29 | 1.97 | 0.018 | 0.005 | 0.045 |
| Sample 6 | Balance | 42.2 | 12.6 | 0.5 | 2.88 | 0.34 | 2.00 | 0.010 | 0.002 | 0.006 |
| Sample 7 | Balance | 34.3 | 8.7 | 4.5 | 2.88 | 0.43 | 2.22 | 0.023 | 0.007 | 0.009 |
| Sample 8 | Balance | 44.8 | 12.8 | 5.4 | 4.73 | 0.15 | 2.02 | 0.013 | 0.008 | 0.001 |
| Sample 9 | Balance | 38.6 | 11 | 10.1 | 0.29 | 0.35 | 2.12 | 0.026 | 0.002 | 0.004 |
| Sample 10 | Balance | 23.2 | 6.8 | 3.4 | 0.29 | 0.26 | 1.99 | 0.022 | 0.004 | 0.002 |
| Sample 11 | Balance | 52.3 | 9.3 | 3.7 | 3.65 | 0.26 | 2.22 | 0.018 | 0.005 | 0.007 |
| Sample 12 | Balance | 26.8 | 7 | 5.5 | 1.22 | 0.43 | 1.99 | 0.316 | 0.003 | 0.005 |

Measurement of the average linear expansion coefficient, a creep rupture test, and a bending test of a welded joint are performed for the austenitic heat resistant steel of each of the sample 1 to the sample 12.

A test piece used for each test is manufactured as described below.

Raw materials necessary for obtaining composition components composing the austenitic heat resistant steel of each of the sample 1 to the sample 12 respectively having the chemical compositions illustrated in Table 1 were melted by a vacuum induction melting furnace, to manufacture ingots each are 2 kg in weight. Each ingot was formed into a plate-shaped member by hot-rolling. The solution heat treatment was performed for the obtained plate-shaped member. In the solution heat treatment, it was heated at a temperature of 940° C. for 30 minutes, and thereafter, it was rapidly cooled to the room temperature by the forced air cooling. Subsequently, the aging treatment was performed for the plate-shaped member. In the aging treatment, it was heated at a temperature of 760° C. for 16 hours, and thereafter, it was cooled to the room temperature by the natural cooling in the air.

The test piece used for each test was obtained from the plate-shaped member such that a stress axis was in parallel with an extend forging direction. The measurement of the average linear expansion coefficient was performed for the test piece of each sample based on JIS Z 2285. The creep rupture test was performed for the test piece of each sample based on JIS Z 2271.

Note that in JIS Z 2285, the average linear expansion coefficient was calculated by using the above-stated expression (1).

Regarding the creep rupture strength, 700° C./100,000 hours creep rupture strength was found. Note that the 700° C./100,000 hours creep rupture strength was found by extrapolation by means of a Larson-Miller method based on a test result obtained by performing a test for a rupture time of approximately 1000 hours in a range where a test temperature was set to 700 to 800° C. and a test stress was set to 200 to 400 MPa.

Besides, hot-drawing process was performed for the ingot with the weight of 2 kg of each of the sample 1 to the sample 12 to process into a welding wire with $\phi 1$ mm. Two pieces of plate materials each with a size of 30 mm×60 mm×150 mm having the same composition with the wire of each composition were beveling processed, and the welded joint is manufactured by butt-welding the same materials. A side bend test piece in 80 mm×30 mm×3 mm was obtained from the manufactured welded joint such that a welded metal part positions at a center. In the test, the test piece was bent by a three-point bending until an angle became 90 degrees, and presence/absence of openings due to cracks was checked.

Average linear expansion coefficient measurement results, creep rupture strength measurement results, and side bend test results are illustrated in Table 2.

TABLE 2

| | 700° C./100,000 hours creep rupture strength [MPa] | Average linear expansion coefficient [$10^{-6}$/K] | Presence/absence of crack occurrences by side bend test |
|---|---|---|---|
| Sample 1 | 71 | 12.8 | Absent |
| Sample 2 | 75 | 15.5 | Absent |
| Sample 3 | 76 | 13.8 | Absent |
| Sample 4 | 76 | 15.4 | Absent |
| Sample 5 | 78 | 16.1 | Absent |
| Sample 6 | 71 | 14.9 | Absent |
| Sample 7 | 78 | 15.6 | Absent |
| Sample 8 | 74 | 14.5 | Absent |
| Sample 9 | 84 | 15.6 | Absent |
| Sample 10 | 55 | 21.5 | Absent |
| Sample 11 | 86 | 16.8 | Present |
| Sample 12 | 90 | 18.9 | Present |

As illustrated in Table 2, the average linear expansion coefficient of the sample 10 being the conventional austenitic heat resistant steel is $18 \times 10^{-6}$/K or more. On the other hand, in each of the sample 1 to the sample 9, the average linear expansion coefficient is $18 \times 10^{-6}$/K or less. The creep rupture strength is the same degree as those of the sample 10 to the sample 12. Besides, in the side bend test of each of the sample 11 and the sample 12, the crack occurrences are recognized. On the other hand, in each of the sample 1 to the sample 9, the crack occurrences by the side bend test are not recognized. Further, the creep rupture strength of the sample 10 is 70 MPa or less. On the other hand, in each of the sample 1 to the sample 9, the creep rupture strength is 70 MPa or more.

From the above-stated results, the reduction in the linear expansion coefficient and the improvement in the weldability are enabled while keeping the high-temperature strength of the conventional austenitic heat resistant steel in each of the sample 1 to the sample 9.

According to the above-described embodiment, it becomes possible to reduce the linear expansion coefficient and to secure the sufficient weldability while keeping the high-temperature strength.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. Austenitic heat resistant steel, containing:
   24 to 50% by mass of Ni, 5 to 13% by mass of Cr, 0.1 to 12% by mass of Co, 0.1 to 5% by mass of Nb, 0.1 to 0.5% by mass of V, 1.90 to 2.35% by mass of Ti, 0.01 to 0.30% by mass of Al, 0.001 to 0.01% by mass of B, 0.001 to 0.1% by mass of C, and the balance being Fe and inevitable impurities.

2. The austenitic heat resistant steel according to claim 1, containing 0.01 to 0.20% by mass of Al.

3. The austenitic heat resistant steel according to claim 1, containing 0.01 to 0.10% by mass of Al.

4. The austenitic heat resistant steel according to claim 1, containing 34 to 45% by mass of Ni.

5. The austenitic heat resistant steel according to claim 1, containing 38 to 45% by mass of Ni.

6. The austenitic heat resistant steel according to claim 1, wherein the austenitic heat resistant steel has an average linear expansion coefficient of $18 \times 10^{-6}$/K or less in temperatures from a room temperature to 700° C.

7. A turbine component including a portion made of the austenitic heat resistant steel according to claim 1.

8. A turbine component welded by the austenitic heat resistant steel according to claim 1.

* * * * *